US 8,363,436 B2

(12) United States Patent
Wang et al.

(10) Patent No.: US 8,363,436 B2
(45) Date of Patent: Jan. 29, 2013

(54) NON-DISSIPATIVE START UP CIRCUIT

(75) Inventors: Shiju Wang, Irvine, CA (US); Chien Nguyen, Huntington Beach, CA (US); Hwangsoo Choi, Fullerton, CA (US)

(73) Assignee: Microsemi Corporation, Alisa Viejo, CA (US)

( * ) Notice: Subject to any disclaimer, the term of this patent is extended or adjusted under 35 U.S.C. 154(b) by 247 days.

(21) Appl. No.: 12/960,504

(22) Filed: Dec. 5, 2010

(65) Prior Publication Data

US 2011/0141775 A1 Jun. 16, 2011

Related U.S. Application Data

(60) Provisional application No. 61/285,193, filed on Dec. 10, 2009.

(51) Int. Cl.
*H02M 1/36* (2007.01)

(52) U.S. Cl. ............................................ 363/49; 307/44

(58) Field of Classification Search ................... 363/49; 323/901; 307/44, 45
See application file for complete search history.

(56) References Cited

U.S. PATENT DOCUMENTS

| | | |
|---|---|---|
| 3,750,003 A | 7/1973 | Petersen |
| 4,686,619 A | 8/1987 | Edwards |
| 4,767,978 A | 8/1988 | Reid |
| 5,179,508 A | 1/1993 | Lange |
| 5,444,309 A | 8/1995 | Innes |
| 5,694,302 A | 12/1997 | Faulk |
| 5,929,666 A | 7/1999 | Fischer |
| 7,319,601 B2 | 1/2008 | Fagnani |
| 2002/0153847 A1 | 10/2002 | Bron |
| 2003/0007366 A1 | 1/2003 | Drummond |
| 2003/0031035 A1* | 2/2003 | Kitano ............................ 363/49 |
| 2009/0147413 A1* | 6/2009 | Aoki ............................... 361/42 |

FOREIGN PATENT DOCUMENTS

| | | |
|---|---|---|
| CN | 1457136 | 11/2003 |
| CN | 201001032 Y | 1/2008 |
| JP | 10191557 A | 7/1998 |

OTHER PUBLICATIONS

L6566A Data Sheet—Published Dec. 2008 by STMicroelectronics.

* cited by examiner

*Primary Examiner* — Gary L Laxton
(74) *Attorney, Agent, or Firm* — Simon Khan

(57) ABSTRACT

A start up circuit constituted of: a first alternating current lead; a second alternating current lead, said second alternating current lead exhibiting an opposing phase of said first alternating current lead; a first capacitor, a first end of said first capacitor coupled to said first alternating current lead; a second capacitor, a first end of said second capacitor coupled to said second alternating current lead; a breakdown diode coupled between a second end of said first capacitor and a second end of said second capacitor; and a third capacitor coupled in parallel with said breakdown diode. A direct current power is developed across the breakdown diode without requiring dissipative elements.

12 Claims, 2 Drawing Sheets

NON-DISSIPATIVE START UP CIRCUIT

CROSS-REFERENCE TO RELATED APPLICATIONS

This application claims priority from U.S. Provisional Patent Application Ser. No. 61/285,193 filed Dec. 10, 2009, the entire contents of which is incorporated herein by reference.

TECHNICAL FIELD

The present invention relates to the field of start up circuits and more particularly to a non-dissipative limited DC power source which may be connected directly to an AC source.

BACKGROUND

Many circuits require a certain amount of initial power to energize, prior to becoming self sustaining. For example, a flyback converter requires an initial amount of power for the control circuitry; however once the control circuitry is operative sufficient power is generated by the flyback converter to drive the control circuitry, such as by an auxiliary winding as part of a bootstrap circuit. Circuitry providing the initial power for the control circuitry is alternately known as a start up circuit or a kick start power source.

Prior art methods of starting up a switched mode power supply typically tap power after a rectifier, and use a voltage divider comprising resistive elements, or a resistor and capacitor combination to supply the start up power. Unfortunately, even after start up power is dissipated through the start up circuit resistive path. Other prior art methods include utilizing a high voltage constant current source, and after start up the constant current source is shut down. However, during start up there is high power dissipation in the start up circuit in the event of a high input voltage.

LED lighting circuits are rapidly coming into wide use, and are preferably designed for use with a wide range of AC voltages found around the world. A single circuit, designed for use with a broad range of voltages, enables reduced cost, since there is no need to have changes between devices produced for various markets. It is to be noted, that the range of AC voltages experienced worldwide, over a broad range of conditions, typically varies from 90 VAC to 350 VAC, RMS.

What is desired, and not supplied by the prior art, is a start up power circuit that does not appreciably dissipate power, and that is preferably useable with a broad range of input voltages.

SUMMARY

In view of the discussion provided above and other considerations, the present disclosure provides methods and apparatus to overcome some or all of the disadvantages of prior and present start up circuits. Other new and useful advantages of the present methods and apparatus will also be described herein and can be appreciated by those skilled in the art.

This is provided in certain embodiments by a start up circuit constituted of a first capacitor connected to a first side of an alternating current source and a second capacitor connected to the opposing side of the alternating current source. A breakdown diode is connected between the capacitors, and a start up capacitor is provided in parallel with the breakdown diode, thus generating the start up power. In particular embodiments, power is drawn from the start up capacitor via a diode, charging an auxiliary start up capacitor, the auxiliary start up capacitor arranged to further receive power from the operative circuitry.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
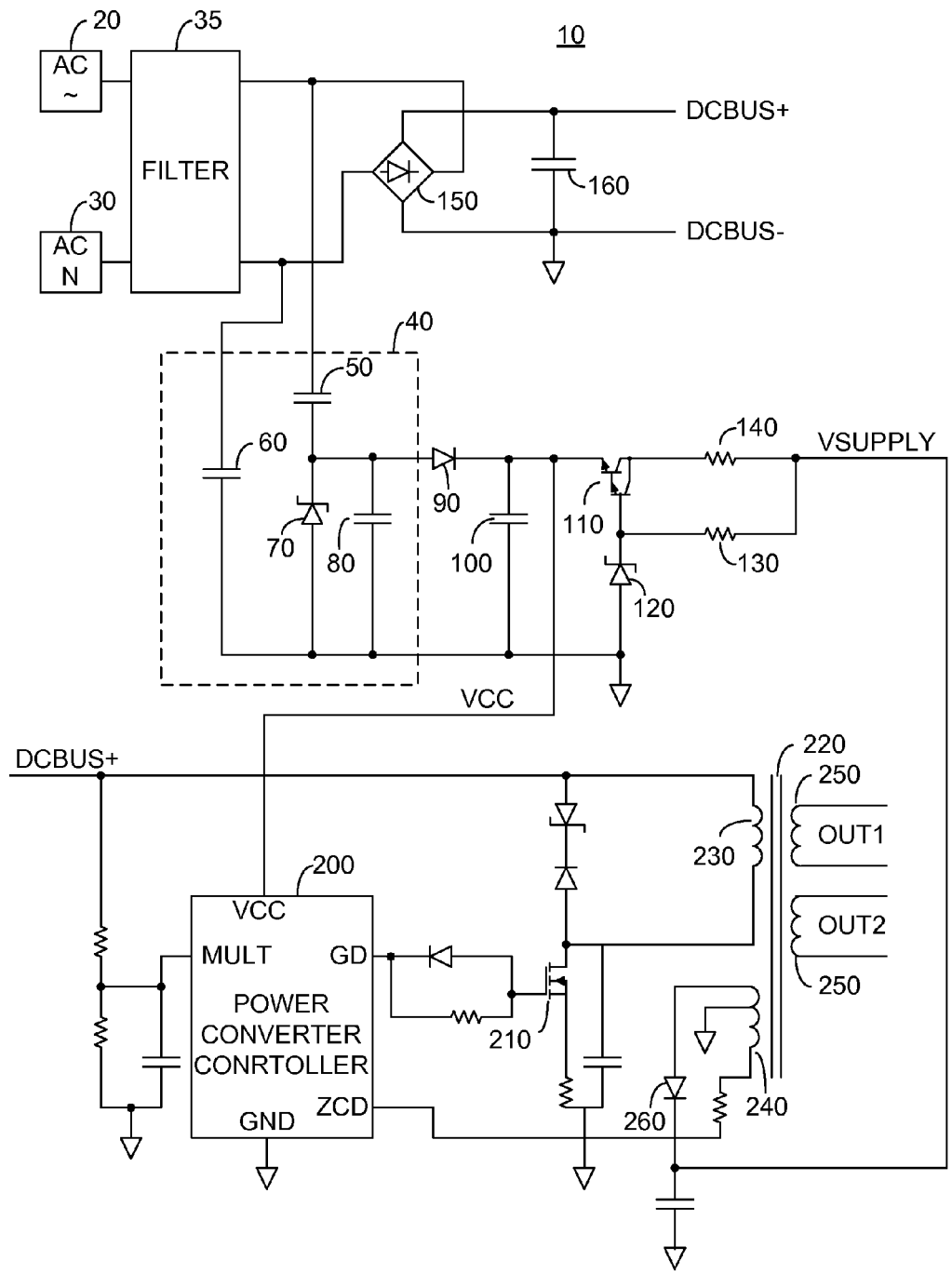
FIG. 1 illustrates a high level schematic diagram of a powering arrangement comprising a start up circuit according to certain embodiments.

Before explaining at least one embodiment in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. The term connected as used herein is not meant to be limited to a direct connection, and the use of appropriate resistors, capacitors and inductors does not exceed the scope thereof.

FIG. 1 illustrates a high level schematic diagram of a powering arrangement 10 comprising a start up circuit 40 according to certain embodiments. In particular, powering arrangement 10 comprises: a first alternating current lead 20, preferably representing a phase connection; a second alternating current lead 30, preferably representing a neutral connection, which is out of phase with the phase connection of first alternating current lead 20; a filter 35; a start up circuit 40 constituted of first capacitor 50, second capacitor 60, breakdown diode 70 and start up capacitor 80; a unidirectional electronic valve 90; an auxiliary start up capacitor 100; an NPN Darlington pair 110; a breakdown diode 120; a resistor 130; a resistor 140; a full wave rectifier 150; an output capacitor 160; a power converter controller 200; an electronically controlled switch 210, illustrated as an NMOSFET; a flyback transformer 220 exhibiting a primary winding 230, an auxiliary winding 240 and a pair of secondary windings 250; and a unidirectional electronic valve 260. In a non-limiting embodiment, power converter controller 200 is constituted of a PFC controller, such as a L6562 transition mode PFC controller available from STMicroelectronics, Geneva, Switzerland.

First alternating current lead 20 is connected via filter 35 to a first input of full wave rectifier 150 and to a first end of first capacitor 50. Second alternating current lead 30 is connected via filter 35 to a second input of full wave rectifier 150 and to a first end of second capacitor 60. A second end of first capacitor 50 is connected to the cathode of breakdown diode 70, to a first end of start up capacitor 80 and to the anode of unidirectional electronic valve 90. The anode of breakdown diode 70 is connected to a second end of second capacitor 60, to a second end of start up capacitor 80 and to a common potential. In one particular embodiment the common potential is a ground potential.

The outputs of full wave rectifier 150 are respectively denoted DCBUS+ and DCBUS−. DCBUS− is connected to the common potential. A first end of output capacitor 160 is connected to DCBUS+ and a second end of output capacitor 160 is connected to DCBUS−.

The cathode of unidirectional electronic valve 90 is denoted VCC and is connected to a first end of auxiliary start up capacitor 100, to the emitter of NPN Darlington pair 110 and to the power input of power converter controller 200, denoted VCC. The second end of auxiliary start up capacitor 100 is connected to the common potential. An output lead from a self sustaining powering circuit, denoted VSUPPLY, is connected via resistor 140 to the collector of NPN Darlington pair 110 and via resistor 130 to the base of NPN Darlington pair 110 and to the cathode of breakdown diode 120. The anode of breakdown diode 120 is connected to the common potential.

DCBUS+ is connected to the common potential via a resistor divider, and the divided voltage of the resistor divider is connected to an input of power converter controller 200, denoted MULT. In one particular embodiment, input MULT represents the main input to a multiplier of power converter controller 200 and provides the sinusoidal reference to the current loop of the PFC controller. Input MULT is further coupled to the common potential via a capacitor. Power converter controller 200 further exhibits a lead denoted GND which is connected to the common potential. The output of power converter controller 200, denoted GD, is connected via a unidirectional electronic valve and a resistor, connected in parallel, to the gate of electronically controlled switch 210. The drain of electronically controlled switch 210 is connected via a unidirectional electronic valve and a breakdown diode, connected in series, to DCBUS+. The drain of electronically controlled switch 210 is further connected to a first end of primary winding 230 and via a capacitor to the common potential. The second end of primary winding 230 is connected to DCBUS+. The source of electronically controlled switch 210 is connected via a resistor to the common potential. Secondary windings 250 of flyback transformer 220 exhibit output voltages, denoted OUT1 and OUT2.

Auxiliary winding 240 exhibits a mid-tap, or center tap, connected to the common potential. A first end of auxiliary winding 240 is connected to the anode of unidirectional electronic valve 260, and the cathode of unidirectional electronic valve 260 represents output VSUPPLY, described above, and is coupled via a capacitor to the common potential. A second end of auxiliary winding 240 is connected via a resistor to a sensing input of power converter controller 200, denoted input ZCD.

In operation, a DC voltage is developed across breakdown diode 70, which in one particular embodiment is implemented as a 14 volt breakdown, or Zener, diode. Advantageously, there is no dissipative loss, since there are no resistors in the path. The amount of current deliverable via start up circuit 40 is limited by the input voltage and the reactance of first capacitor 50 and second capacitor 60, and is represented as:

$$I \approx \pi * f * C * VIN/2 \qquad \text{EQ. 1}$$

where "f" represents the frequency of the AC power signal received between first alternating current lead 20 and second alternating current lead 30, VIN represents the RMS value of the AC power signal received between first alternating current lead 20 and second alternating current lead 30, and C represents the average values of first capacitor 50 and second capacitor 60. In an exemplary embodiment the value of first capacitor 50 is the same as the value of second capacitor 60. As indicated above, in a typical environment in which first alternating current lead 20 and second alternating current lead 30 represent an AC mains connection, VIN may vary between 90 VAC and 350 VAC, RMS.

The voltage developed across breakdown diode 70 is smoothed by start up capacitor 80, and is coupled to the power input of power converter controller 200 via unidirectional electronic valve 90. Power converter controller 200 starts up responsive to the voltage developed across breakdown diode 70, and preferably does not require current in excess of that provided by start up circuit 40, as determined in EQ. 1, to begin operation. In the event that VIN is on the high side of the range, sufficient current may be supplied via start up circuit 40 for continuous operation of power converter controller 200.

After startup of power converter controller 200, power converter controller 200 opens and closes electronically controlled switch 210 so as to alternately charge and discharge transformer 220 by driving current from DCBUS+ through primary winding 230. Output voltages are developed at OUT1 and OUT2 via secondary windings 250, and a self sustaining power VSUPPLY is developed across auxiliary winding 240 and fed to NPN Darlington pair 110, auxiliary winding 240 and NPN Darlington pair 110 forming a bootstrap circuit. The base of NPN Darlington pair 110 is clamped to a predetermined value by breakdown diode 120, and thus NPN Darlington pair 110 will only conduct when the voltage across auxiliary start up capacitor 100 falls to twice the forward drop below the breakdown voltage of breakdown diode 120.

Thus, in the event that sufficient power is supplied via start up circuit 40, NPN Darlington pair 110 remains off, and power converter controller 200 is powered by start up circuit 40. In the event that power converter controller 200 requires power in excess of that which may be supplied by start up circuit 40, for example in the event that VIN is on the low side of the potential input voltages, the voltage across auxiliary start up capacitor 100 will begin to fall, as charge is drawn off by power converter controller 200, thus turning on NPN Darlington pair 110, and providing power for power converter controller 200 from self sustaining power VSUPPLY. Thus, VSUPPLY is only drawn for power needs in excess of power deliverable by start up circuit 40, as described above in relation to EQ. 1, resulting in very high efficiency.

Figure 2:
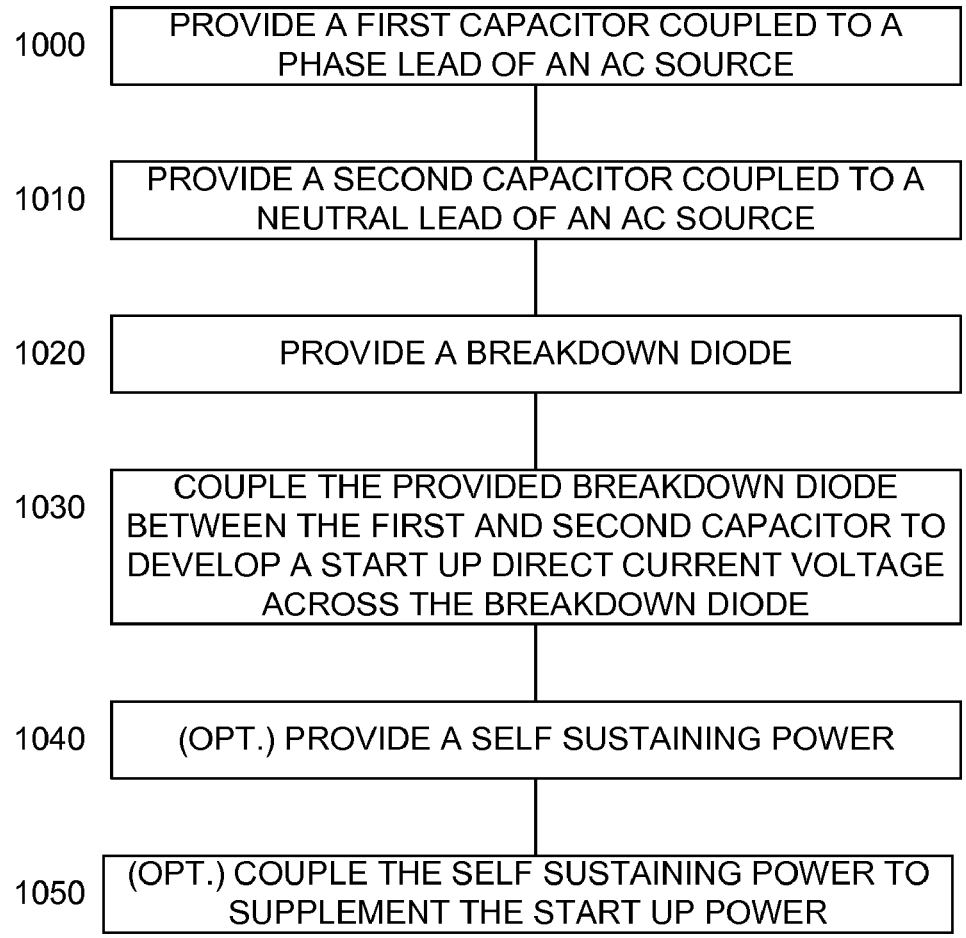
FIG. 2 illustrates a high level flow chart of a method according to certain embodiments.

FIG. 2 illustrates a high level flow chart of a method according to certain embodiments. In stage 1000 a first capacitor is provided coupled to a first AC lead, such as a phase lead. In stage 1010 a second capacitor is provided coupled to a second AC lead, exhibiting the opposing phase from the phase of stage 1000, such as the neutral lead. In stage 1020 a breakdown diode is provided.

In stage 1030 the breakdown diode is coupled between the provided first and second capacitors of stages 1000 and 1010, thus being arranged to develop a start up DC voltage across the provided breakdown diode of stage 1020. In optional stage 1040 a self sustaining power is provided, and in stage 1050, the provided self sustaining power of stage 1040 is coupled to supplement the start up power of stage 1030. Preferably, the self sustaining power supplements the start up power only when the power requirements are greater than can be supplied by the start up power of stage 1030.

Thus the present embodiments enable a non-dissipative start up circuit comprising a first line capacitor, a second line capacitor, a breakdown diode coupled between the line capacitors, and a start up capacitor is provided in parallel with the breakdown diode, thus generating the start up power. In particular embodiments, power is drawn from the start up capacitor via a diode, charging an auxiliary start up capacitor, the auxiliary start up capacitor arranged to further receive power from a self sustaining circuit.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A powering arrangement comprising:
    a first capacitor, a first end of said first capacitor connected to a first side of an alternating current;
    a second capacitor, a first end of said second capacitor connected to a second side of the alternating current, said second side opposing said first side;
    a breakdown diode coupled between a second end of said first capacitor and a second end of said second capacitor; and
    a third capacitor coupled in parallel with said breakdown diode.

2. The powering arrangement according to claim 1, further comprising a power converter, said power converter coupled to receive power from said second capacitor.

3. The powering arrangement according to claim 2, further comprising a self sustaining powering circuit arranged to supply power to said power converter after startup of said power converter.

4. The powering arrangement of claim 3, further comprising a unidirectional electronic valve and a fourth capacitor, said unidirectional electronic valve arranged to allow the flow of current from said third capacitor to said fourth capacitor, said fourth capacitor further arranged to receive power from said self sustaining powering circuit, said power converter coupled to said fourth capacitor thereby receiving said power from said second capacitor.

5. The powering arrangement of claim 4, wherein said power converter comprises a transformer, and wherein said self sustaining circuit comprises a winding of said transformer and a transistor, said transistor arranged to pass power from said winding to said fourth capacitor, when said voltage is in excess of a predetermined value.

6. The powering arrangement of claim 1, further comprising a means for receiving the alternating current, and a filter, said first end of said first capacitor and said first end of said second capacitor coupled to outputs of said filter thus being respectively connected to said first side and said second side of the alternating current.

7. A start up circuit comprising:
    a first alternating current lead;
    a second alternating current lead, said second alternating current lead exhibiting an opposing phase of said first alternating current lead;
    a first capacitor, a first end of said first capacitor coupled to said first alternating current lead;
    a second capacitor, a first end of said second capacitor coupled to said second alternating current lead;
    a breakdown diode coupled between a second end of said first capacitor and a second end of said second capacitor; and
    a third capacitor coupled in parallel with said breakdown diode.

8. The start up circuit of claim 7, further comprising a self sustaining powering circuit arranged to supply power to a power converter after startup of the power converter responsive to said start up circuit.

9. The start up circuit of claim 8, further comprising a unidirectional electronic valve and a fourth capacitor, said unidirectional electronic valve arranged to allow the flow of current from said third capacitor to said fourth capacitor, said fourth capacitor further arranged to receive power from said self sustaining circuit, the power converter coupled to said fourth capacitor thereby receiving said power from said second capacitor during startup and from said self sustaining powering circuit after startup.

10. The start up circuit of claim 7, further comprising an alternating current filter disposed between said first alternating current lead and said first end of said first capacitor and further disposed between said second alternating current lead and said first end of said second capacitor.

11. A method for providing non-dissipative start up power, said method comprising:
    providing a first capacitor coupled to a phase lead of an alternating current source;
    providing a second capacitor coupled to a neutral lead of the alternating current source;
    providing a breakdown diode;
    coupling said provided breakdown diode between said first capacitor and said second capacitor thereby developing a direct current voltage across said breakdown diode, thus providing a start up power;
    coupling said developed direct current voltage to a power converter;
    providing a self sustaining power; and coupling said provided self sustaining power to feed power to said power converter when the power requirements of said power converter exceeds that available from the provided start up power.

12. The method of claim 11, wherein said self sustaining power is provided by the power converter.

* * * * *